Figure 5:
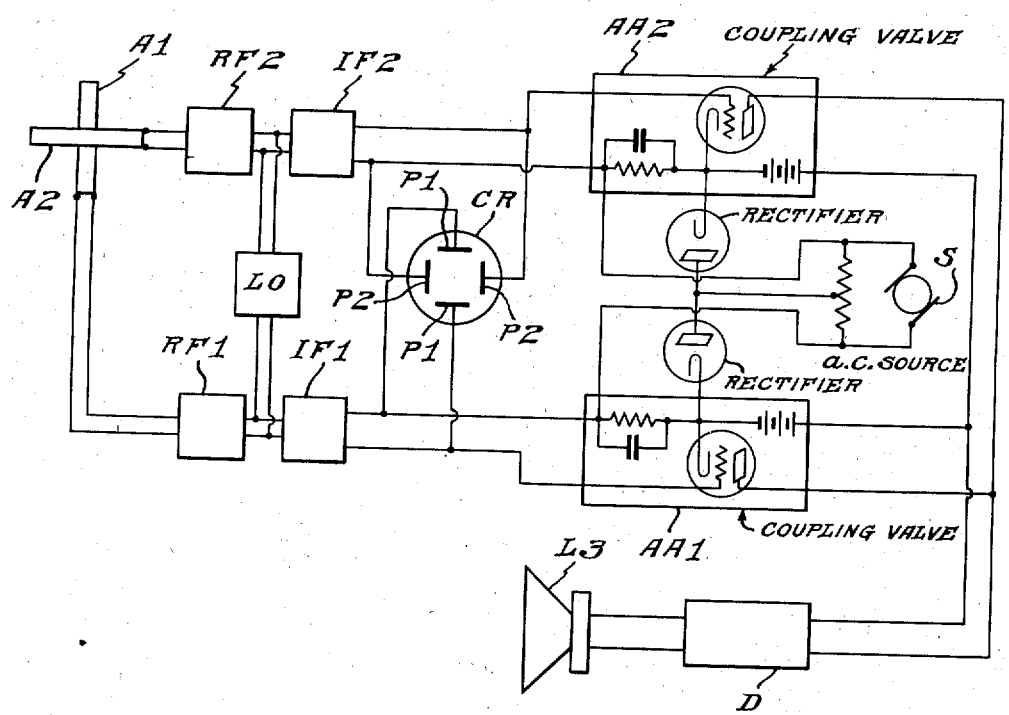

April 22, 1941.  S. B. SMITH ET AL  2,238,951
DIRECTION FINDER MONITOR
Filed Nov. 15, 1938  2 Sheets-Sheet 1
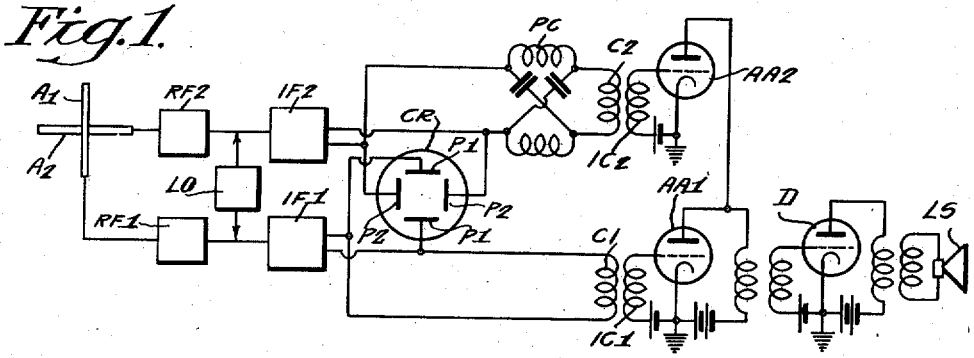
Fig.1.
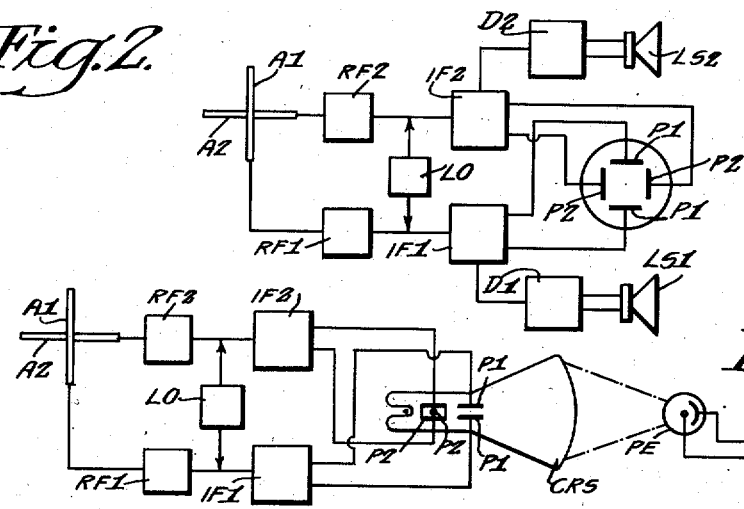
Fig.2.
Fig.3.
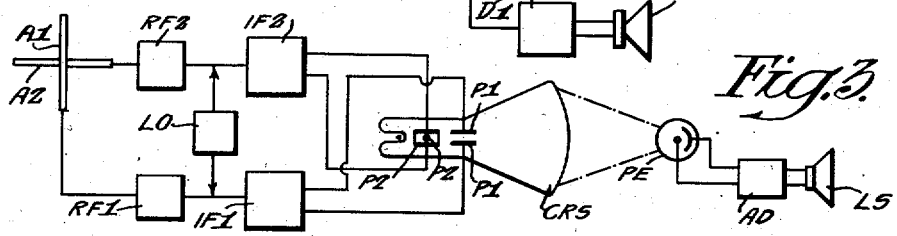
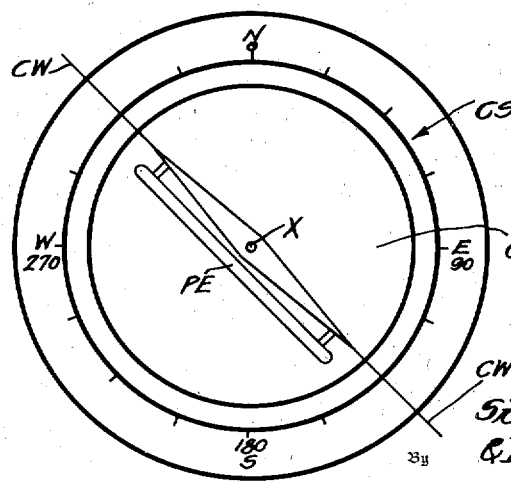
Fig.4
Inventors
Sidney Bertram Smith
& Roland John Kemp
By
Attorney Patented Apr. 22, 1941

2,238,951

UNITED STATES PATENT OFFICE 2,238,951

DIRECTION FINDER MONITOR

Sidney Bertram Smith and Roland John Kemp, Chelmsford, England, assignors to Radio Corporation of America, a corporation of Delaware Application November 15, 1938, Serial No. 240,446
In Great Britain December 16, 1937

2 Claims. (Cl. 250—11)

This invention relates to direction finding radio receivers and more particularly to direction finding radio receivers of the type now becoming known as the "two-path" type. By a "two-path" radio direction finding receiver is meant a receiver wherein the direction of an incoming radio signal is resolved into two mutually perpendicular component directions, signals corresponding to those components being applied via separate amplifier paths or channels to an oscillograph instrument (usually a cathode ray tube) which accordingly indicates the direction of the incoming signal. The resolution of the incoming signal direction into two mutually perpendicular components may be effected by any of a variety of known aerial systems, it being common practice to employ for this purpose a pair of mutually perpendicular frame aerials but, of course, other suitable directional aerials may be used. The term "two-path" is commonly applied to radio receivers of the type in question because there are two energy paths—one dealing with each directional component—between the directional aerial system and the oscillograph instrument. In two-path direction finding radio receivers, it is often desired to provide means for "monitoring" the apparatus, and it is common practice to provide an open aerial with its own associated amplifier-receiver for this purpose. The addition of the open aerial and extra amplifier-receiver involves undesired additional expense and complexity and the main object of the present invention is to enable satisfactory "monitoring" to be employed without the need for providing an additional nondirectional aerial and associated amplifier-receiver.

Monitoring cannot satisfactorily be accomplished in a receiver of the type referred to by employing for the purpose energy taken from one of the amplifiers in one of the two paths to the indicating instrument or even by taking energy from both paths and simply directly combining these energies, for, if either of these expedients be adopted, there will be, owing to the directional characteristics of the aerials employed, directions for which substantially zero signal strength is obtained in the monitoring channel. The need for providing monitoring means arises mainly because, in the normal operation of an instantaneous direct reading direction finder of the type in question, it is necessary to obtain the station identification signal and the station bearing simultaneously and, since the monitoring system is required for the former purpose, the monitoring means must be operative for all incoming signal directions.

According to this invention in its broadest aspect, the above difficulties are met by energizing an audio or other monitoring indicator means by energies obtained from the two paths between the directional aerial system to the cathode ray tube or other direction indicator, the said energies being combined in such manner as to produce a resultant which is substantially independent of the relative phase of the two said energies as taken from the two said paths.

There are four ways in which the invention may be carried into effect:

(1) Energy taken from the two paths, either from signal frequency, intermediate frequency or audio frequency stages in those paths, may be combined in phase quadrature and utilized to operate the monitoring indicator.

(2) Energies taken from the two paths may be used to operate each its own loudspeaker or telephone. In this method the two loudspeakers or telephones together constitute the monitoring indicator means, the actual combination of energy being an audio combination taking place between the loudspeakers and the ear of the observer.

(3) Energy may be taken alternately from each of the two paths to a monitoring channel terminating in a monitoring indicator, this channel being switched over from one path to the other and back again so that the amplifier chain in each path is monitored each half cycle of the switching frequency, and (4) Where the direct reading directional indicating instrument is a cathode ray tube or other oscillograph giving a light indication, the light from the said oscillograph may be employed to control a monitoring channel terminating in the monitoring indicator means; that is to say, this light may be translated into electric current which is used as the input to the monitoring channel.

The invention is illustrated in and further explained in connection with the accompanying drawings, in which Figure 1 is a schematic circuit diagram of one embodiment of the invention; Figure 2 is a schematic circuit diagram of a modification of the invention; Figure 3 is a schematic circuit diagram of another modification; Figure 4 is an end view of a modification of the cathode ray tube and photoelectric cell of Fig. 3; and Figure 5 is a modification of the invention employing a single detector and switching means. Similar reference numerals will be applied to similar elements of the drawings.

Referring to Fig. 1, which shows diagrammatically one embodiment, the two-path radio direction finding receiver therein illustrated comprises a directional aerial system, two mutually perpendicular frame aerials A1, A2, each of which feeds into one or other of the two paths. Each path comprises a radio frequency amplifier RF1 and RF2 followed by an intermediate frequency amplifier IF1 or IF2, a common local oscillator LO being provided to beat with the outputs from both radio frequency amplifiers to derive the same predetermined intermediate frequency for both intermediate frequency amplifiers. The directional indicator consists of a cathode ray tube CR with the usual fluorescent screen at one end and the usual mutually perpendicular ray deflecting systems, for example, two mutually perpendicular pairs P1, P1 and P2, P2 of electrostatic deflection plates. In Fig. 1, the tube CR is represented in purely diagrammatic manner as viewed along the axial line of the usual electron gun (not shown) therein. One ray deflecting system P1, P1 is fed from the output of the intermediate frequency amplifier IF1 in one path and the other deflecting system P2, P2 is fed from the intermediate frequency amplifier IF2 in the other path.

As so far described, the receiver is as shown but, in accordance with this invention, the output from one intermediate frequency amplifier IF1 is fed to one coupling coil C1 and the output from the other intermediate frequency amplifier IF2 is fed to another coupling coil C2, the circuit to at least one of these coupling coils (as shown the coil C2) containing a phase shifting, preferably adjustable network PC of any form known per se whereby a quadrature relation may be caused to exist as between the energy in one coupling coil C1 and the energy in the other C2. Each coupling coil is coupled to an input coil IC1 or IC2 in the grid cathode circuit of one or other of two combining valves AA1 and AA2. The two combining valves have their anodes connected together, the common anode circuit being coupled to the input circuit of a common detector D, the output from which is fed, via an audio amplifier (not shown) if desired, to a loudspeaker LS or telephone which constitutes the monitoring indicator means. It will be seen that with this arrangement, although the polar diagrams of each of the directional aerials is a figure of eight, since these figure of eight diagrams are mutually perpendicular, the effective polar diagram by which the signals fed to the loudspeaker may be deemed to be represented is a circle.

In the embodiment of Fig. 2, the two paths to the mutually perpendicular ray deflecting systems P1, P1, P2, P2 of the cathode ray tube CR are as in Fig. 1 but two monitoring detectors D1, D2 are employed, one being fed by energy taken from the intermediate frequency amplifier IF1 in one path and the other by energy taken from the intermediate frequency amplifier IF2 in the other path. Each detector feeds, after such audio amplification as may be necessary (no audio amplifiers are shown) into its own loudspeaker LS1 or LS2, the two loudspeakers jointly constituting the monitoring indicating means.

In a modification illustrated in Fig. 5 of the embodiment of Fig. 2, instead of employing two monitoring detectors D1, D2 and two loudspeakers LS1, LS2, the detector input circuits being permanently connected one to one and the other to the other of the intermediate frequency amplifiers IF1, IF2 in the two paths, only a single monitoring detector D and associated loudspeaker L3 are employed and this detector is arranged to be fed alternately from one or other of two coupling valves which receive their inputs the one from one path and the other from the other. A locally provided source S of alternating current is employed as a switching means to render the coupling valves AA1, AA2 alternately inoperative, one coupling valve being operative while the other is not and vice versa. Accordingly, the single monitoring detector is fed alternately from each path so that the amplifier chains in the two paths are monitored each alternate half cycle of the switching frequency. The necessary switching action can be obtained in any manner known per se, but is preferably obtained purely electrically, that is to say, without the interposition of mechanically moving parts; for example, by utilizing the locally provided alternating current to operate a diode network which provides suitable bias voltages which are employed alternately to cut off the two coupling valves.

In the embodiment illustrated in Fig. 3, an amplifier detector AD which feeds a monitoring loudspeaker LS receives its input from a photoelectric cell PE positioned to receive light generated on the fluorescent screen CRS of the cathode ray tube CR indicator. This photoelectric cell may be arranged to receive general illumination from the screen as indicated in Fig. 3 but the arrangement now to be described with reference to Fig. 4 is preferred.

Referring to Fig. 4 which represents, to a considerably enlarged scale as compared with the other figures, the screen end of the tube, the said tube is provided, as is usual with a cathode ray tube indicator in a receiver of the type in question, with a compass scale CS, round the edge of the screen CRS of the tube, and a cross wire or pointer CW is mounted so that it can be rotated by hand about a pivot X which is centrally positioned with respect to said screen, the ends of the cross wire or pointer projecting over the compass scale so that an operator may swing the said cross wire or pointer until its position coincides with the line of light on the fluorescent screen, the bearing being then directly read on the compass scale. Where, as is now envisaged, the light from the fluorescent screen is to be used to feed a photoelectric cell PE which provides the input for the monitoring detector (not shown in Fig. 4) it is preferred to use as the said cell a strip-like cell PE which is mechanically mounted on the carriage of the cross wire or pointer and is in substantially the same plane as the said cross wire or pointer so that this cell will receive practically only the light from the line of light on the screen rather than the whole general illumination of the screen. The main improvement obtained with this arrangement as compared to one as shown in Fig. 3 where the cell is simply mounted opposite the tube screen is that of increased effective selectivity.

Having now particularly described and ascertained the nature of our said invention and in what manner the same is to be performed, we declare that what we claim is:

1. A direction finding radio receiver including a pair of directional antennas arranged for directive reception throughout 360°, a pair of amplifiers respectively connected to said directional antennas, a cathode ray tube including pairs of deflecting elements, means connecting said amplifiers to said pairs of elements to thereby indicate the bearing of the source of signals received on said antennas as a function of the cathode ray trace, a monitoring indicator, a photoelectric cell, and means connecting said monitoring indicator to said photoelectric cell, said photoelectric cell being so located with respect to said cathode ray tube that light from said trace is applied thereto irrespectively of the indicated bearing of said received signals.

2. A direction finding radio receiver including a pair of directional antennas, arranged for directive reception throughout 360°, a pair of amplifiers respectively connected to said directional antennas, a cathode ray tube including a screen and pairs of deflecting elements, means connecting said amplifiers to said pairs of elements to thereby indicate the bearing of the source of signals received on said antennas as a function of the cathode ray trace, a monitoring indicator, a photoelectric cell, means connecting said monitoring indicator to said photoelectric cell, said cell being responsive to only a line of light on said screen, a manually movable pointer rotatably mounted adjacent said screen, and means including said pointer for orienting said photoelectric cell to correspond to said trace and said pointer position so that said photoelectric cell is responsive to said cathode ray trace.

SIDNEY BERTRAM SMITH
ROLAND JOHN KEMP.